(12) United States Patent
Karlsson

(10) Patent No.: US 10,622,795 B2
(45) Date of Patent: Apr. 14, 2020

(54) TRANSITION FOR PASSAGE THROUGH A WALL, AND MODULE

(71) Applicant: Roxtec AB, Karlskrona (SE)

(72) Inventor: Milton Karlsson, Trensum (SE)

(73) Assignee: Roxtec AB, Karlskrona (SE)

( * ) Notice: Subject to any disclaimer, the term of this patent is extended or adjusted under 35 U.S.C. 154(b) by 0 days.

(21) Appl. No.: 15/777,521

(22) PCT Filed: Nov. 7, 2016

(86) PCT No.: PCT/SE2016/051094
§ 371 (c)(1),
(2) Date: May 18, 2018

(87) PCT Pub. No.: WO2017/086859
PCT Pub. Date: May 26, 2017

(65) Prior Publication Data
US 2018/0375314 A1    Dec. 27, 2018

(30) Foreign Application Priority Data
Nov. 18, 2015 (SE) ........................... 1551489

(51) Int. Cl.
*H02G 3/22* (2006.01)
*A62C 3/16* (2006.01)
(Continued)

(52) U.S. Cl.
CPC .............. *H02G 3/22* (2013.01); *A62C 2/065* (2013.01); *A62C 3/16* (2013.01); *F16L 5/04* (2013.01)

(58) Field of Classification Search
None
See application file for complete search history.

(56) References Cited

U.S. PATENT DOCUMENTS 4,189,619 A * 2/1980 Pedlow .................. C09D 5/185
                                                   106/18.11
4,245,445 A * 1/1981 Heinen ...................... F16L 5/02
                                                   52/220.8
(Continued)

FOREIGN PATENT DOCUMENTS

CN      201038680 Y     3/2008
CN      101263635 A     9/2008
(Continued)

OTHER PUBLICATIONS

International Search Report and Written Opinion for PCT/SE2016/051094 dated Jan. 19, 2017.
(Continued)

*Primary Examiner* — Timothy J Thompson
*Assistant Examiner* — Muhammad Azam
(74) *Attorney, Agent, or Firm* — Merchant & Gould P.C.

(57) ABSTRACT

A transition for passage of cables (4), wires, and/or pipes through a wall or other barrier and also a module (3) forming a part of the transition, wherein the transition includes a frame (1, 22, 26, 28, 30, 31, 33), having one or more through openings, a compression unit (2) inside each through opening of the frame (1, 22, 26, 28, 30, 31, 33), and one or more modules (3) for receiving the cables (4), wires, and/or pipes. Each module (3) includes two module halves (5, 11-15, 35). Each module (3) includes an outer shell of a compressible material and an intumescent material (6) placed inside the outer shell of the module (3).

13 Claims, 3 Drawing Sheets

(51) Int. Cl.
*F16L 5/04* (2006.01)
*A62C 2/06* (2006.01)

(56) References Cited

U.S. PATENT DOCUMENTS

| | | | | |
|---|---|---|---|---|
| 4,249,353 A * | 2/1981 | Berry | F16L 5/04 | 52/232 |
| 4,276,332 A * | 6/1981 | Castle | A62C 3/16 | 138/149 |
| 4,419,535 A * | 12/1983 | O'Hara | H02G 3/22 | 169/48 |
| RE32,131 E * | 4/1986 | Stahl | C09D 5/185 | 106/18.11 |
| 4,702,444 A * | 10/1987 | Beele | H02G 3/22 | 174/151 |
| 4,764,422 A * | 8/1988 | Hill | H01B 1/22 | 428/309.9 |
| 4,842,156 A * | 6/1989 | Nattel | H02G 3/125 | 220/3.9 |
| 4,919,372 A * | 4/1990 | Twist | F16L 5/14 | 248/56 |
| 5,027,571 A * | 7/1991 | Wolff | F16L 5/02 | 174/481 |
| 5,108,060 A * | 4/1992 | Beele | F16L 5/14 | 248/56 |
| 5,174,782 A * | 12/1992 | Bogiel | H01R 23/667 | 439/404 |
| 5,344,106 A * | 9/1994 | Beele | A62C 2/06 | 248/56 |
| 5,349,790 A * | 9/1994 | Beetles | E04D 13/1407 | 52/19 |
| 5,416,271 A * | 5/1995 | Birmingham | F16L 5/08 | 174/657 |
| 5,493,068 A * | 2/1996 | Klein | H02G 3/22 | 174/151 |
| 5,783,776 A * | 7/1998 | Birmingham | F16L 5/08 | 174/657 |
| 6,130,381 A * | 10/2000 | Keith | A62C 3/16 | 174/121 A |
| 6,287,148 B1 * | 9/2001 | Huang | H01R 9/032 | 439/607.41 |
| 6,390,135 B1 * | 5/2002 | Shimizu | F16L 5/04 | 138/106 |
| 6,848,227 B2 * | 2/2005 | Whitty | H02G 3/22 | 174/482 |
| 7,478,503 B2 * | 1/2009 | Milani | E04B 5/48 | 277/615 |
| 8,006,447 B2 * | 8/2011 | Beele | A62C 2/065 | 428/314.4 |
| 8,051,614 B1 * | 11/2011 | Peck | G02B 6/4459 | 174/481 |
| 8,181,995 B2 * | 5/2012 | Decarlo | A61B 18/14 | 174/650 |
| 9,667,047 B1 * | 5/2017 | Vrame | H02G 3/085 | |
| 9,765,908 B2 * | 9/2017 | Andersson | F16L 5/08 | |
| 2004/0093814 A1 * | 5/2004 | Cordts | F16L 5/04 | 52/220.8 |
| 2004/0231880 A1 * | 11/2004 | Beele | A62C 3/16 | 174/668 |
| 2005/0115733 A1 * | 6/2005 | Kreutz | F16L 5/14 | 174/652 |
| 2005/0133242 A1 * | 6/2005 | Kreutz | E04F 17/08 | 174/654 |
| 2005/0179214 A1 * | 8/2005 | Beele | F16L 5/04 | 277/628 |
| 2006/0053710 A1 * | 3/2006 | Miller | H02G 3/0412 | 52/232 |
| 2006/0117677 A1 * | 6/2006 | Muenzenberger | F16L 5/04 | 52/100 |
| 2007/0175649 A1 * | 8/2007 | Moselle | A62C 2/065 | 174/50 |
| 2008/0115955 A1 * | 5/2008 | Gorin | H02G 3/085 | 174/66 |
| 2009/0194644 A1 * | 8/2009 | Lundborg | F16L 5/08 | 248/49 |
| 2012/0048616 A1 * | 3/2012 | Breen, IV | H02G 3/22 | 174/651 |
| 2013/0228657 A1 * | 9/2013 | Sprenger | H02G 3/083 | 248/56 |
| 2013/0233615 A1 * | 9/2013 | Pimentel | G02B 6/4477 | 174/650 |
| 2014/0138920 A1 * | 5/2014 | Munroe | F16L 39/02 | 277/606 |
| 2014/0357314 A1 * | 12/2014 | Schlipf | H04W 88/04 | 455/552.1 |
| 2015/0128681 A1 * | 5/2015 | Stier | G01N 27/4078 | 73/23.31 |
| 2015/0285408 A1 * | 10/2015 | Cox | F16L 5/14 | 277/628 |
| 2015/0321034 A1 * | 11/2015 | Qiang | A62C 3/16 | 169/51 |

FOREIGN PATENT DOCUMENTS

| | | |
|---|---|---|
| CN | 201252372 Y | 6/2009 |
| DE | 102005062655 B3 | 3/2007 |
| DE | 102009008038 A1 | 9/2010 |
| GB | 2476345 A | 6/2011 |
| WO | WO 96/11353 A1 | 4/1996 |
| WO | WO 2008/069716 A1 | 6/2008 |
| WO | 2011011320 A2 | 1/2011 |

OTHER PUBLICATIONS

Search Report for European Patent Application No. 16866746.7 dated May 23, 2019.
Chinese Office Action for CN Application No. 201680067036.9 dated Jul. 8, 2019 (11 pages), including translation.
Translation of Chinese Search Report for CN Application No. 201680067036.9 dated Jun. 23, 2019 (2 pages).

* cited by examiner

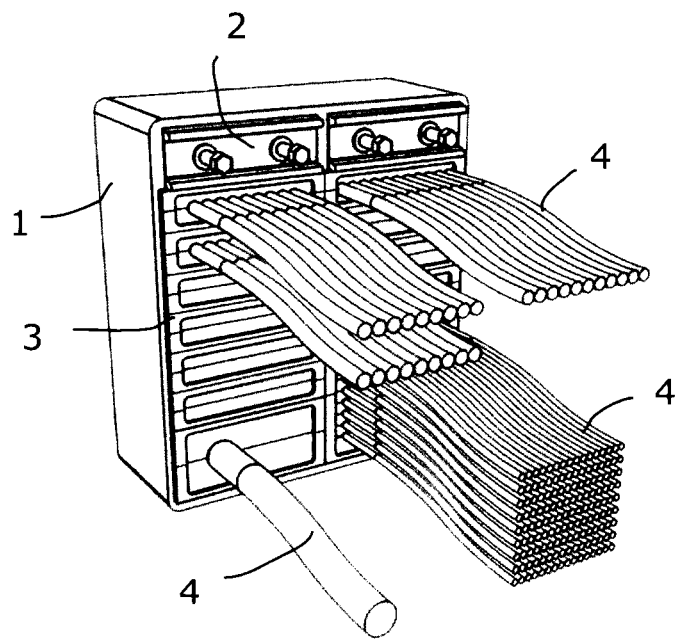
Fig. 1
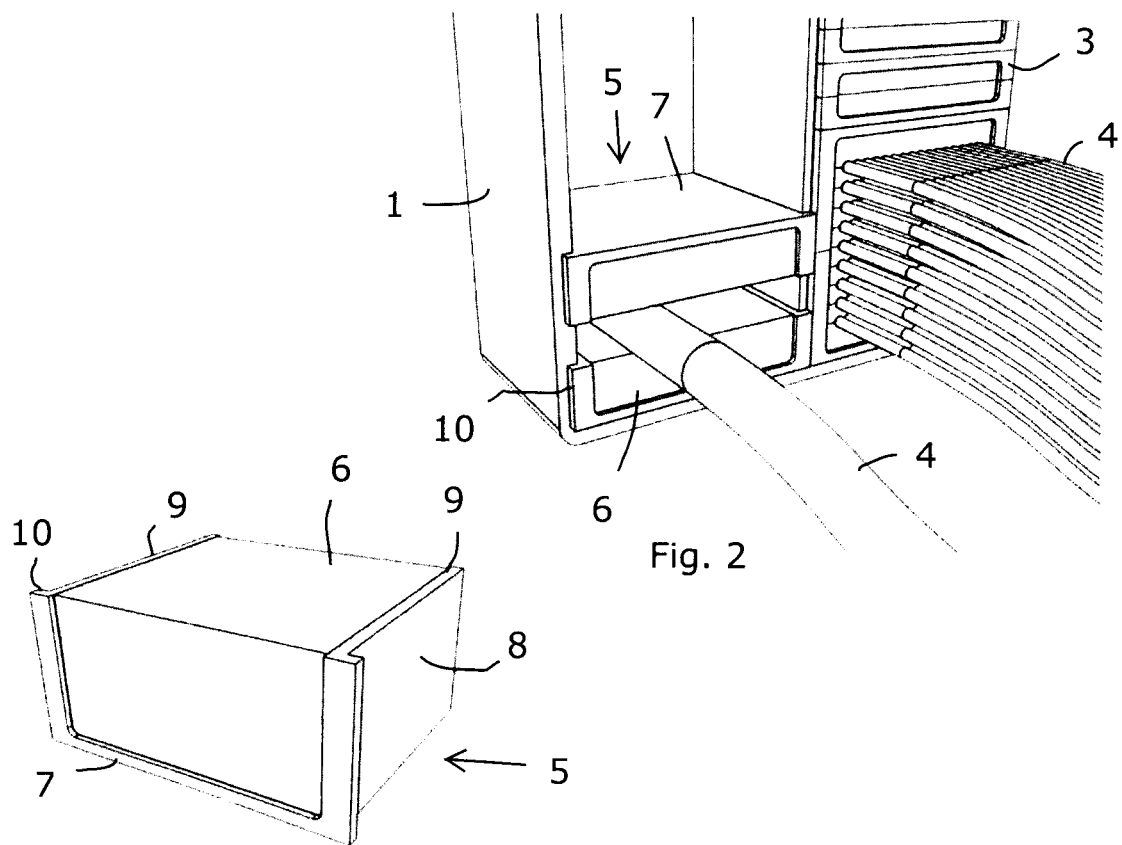
Fig. 2
Fig. 3

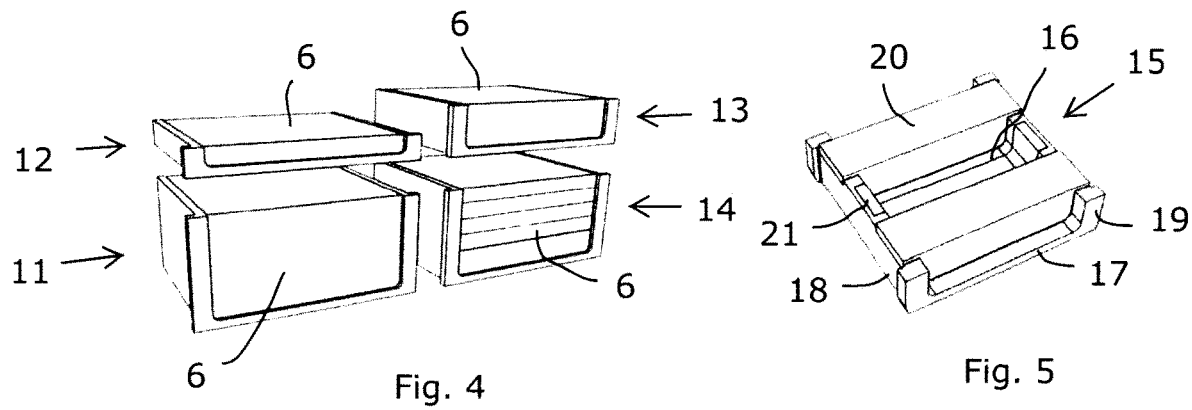
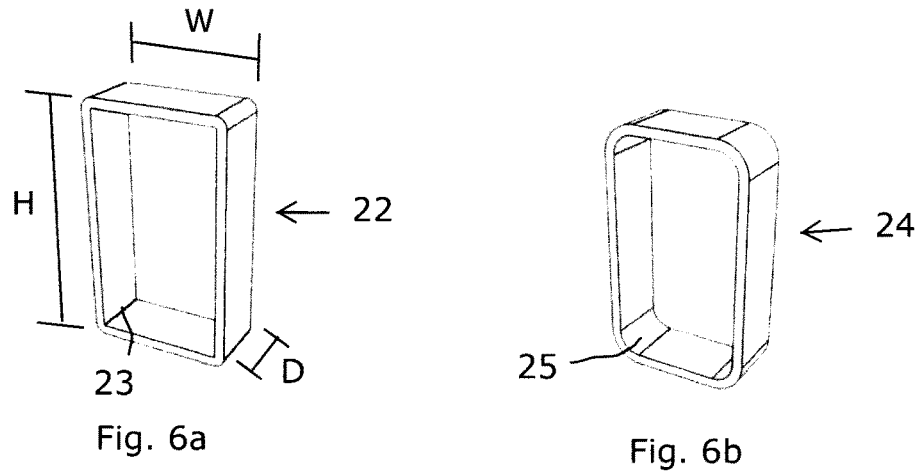
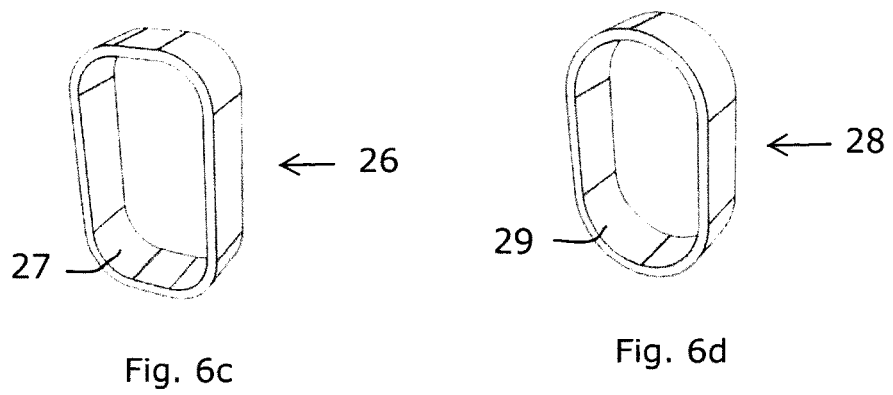

TRANSITION FOR PASSAGE THROUGH A WALL, AND MODULE

This application is a National Stage Application of PCT/SE2016/051094, filed 7 Nov. 2016, which claims the benefit of priority to Swedish Patent Application No. 1551489-06, filed 18 Nov. 2015, which applications are incorporated herein by reference. To the extent appropriate, a claim of priority is made to each of the above disclosed applications.

TECHNICAL FIELD

The present invention concerns a transition for cables, pipes or wires and a module forming a part of the transition.

BACKGROUND

Cables, pipes or wires are often passed through openings in different types of walls or other barriers. Such barriers could be walls, roofs, bulkheads or decks of a ship. The cables etc. are normally placed in a transition or lead-through in the opening of the barrier. The transition is to give a seal between the different areas on respective side of the barrier.

Often the transition is to give a fire and smoke protection, i.e. to hinder fire and/or smoke to go from one side of the transition to the other side of the transition. In this respect an intumescent material is often used. As is well known to a person skilled in the art, the intumescent material will swell when excerted to extensive heat, such as by fire.

In this description the term "cable" is often used for conveniance but should be construed to also refer to pipes or wires.

SUMMARY

The transition and module of the present invention are to give a fire and smoke protection. Furthermore, the transition and its different parts should be easy to handle and be adaptable to receive both separate cables as well as several cables placed close to each other in one or more layers.

The transition is to be placed in a wall, a roof, a bulkhead, a deck or the like and a frame of the transition is normally welded or bolted to the structure, in form of a wall, roof, bulkhead, deck or the like. The transition comprises a number of modules and at least one compression unit inside a through opening of the frame.

According to one aspect of the present invention the modules have the form of an outer shell, inside of which outer shell an intumescent material is placed. Cables are to be placed in contact with the intumescent material inside the modules. According to one embodiment of the present invention the modules have two or more compartments oriented transversely to the longitudinal direction of a cable received inside the module. At least one of said compartments receives an intumescent material. Other compartments may receive cellular rubber or a similar material, preventing passage of smoke.

Further objects and advantages of the present invention will be obvious to a person skilled in the art reading the detailed description below.

BRIEF DESCRIPTION OF THE DRAWINGS

The invention will be explained further below by way of example and with reference to the enclosed drawings. In the drawings:

FIG. 1 is a perspective view of one embodiment of a transition according to the present invention, FIG. 2 is an enlarged perspective view of the transition of FIG. 1, with parts removed in illustrative purpose, FIG. 3 is a perspective view of one example of a module half of a module according to the present invention, FIG. 4 is a perspective view of alternative embodiments of module halves of modules according to the present invention, FIG. 5 is a perspective view of still a further alternative module half, and FIGS. 6a-6g are perspective views of different embodiments of a frame forming a part of a transition according to the present invention.

DETAILED DESCRIPTION

Figure 6E:
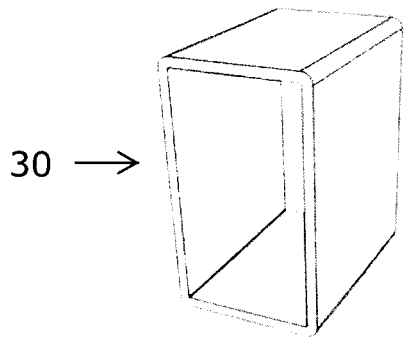
Figure 6F:
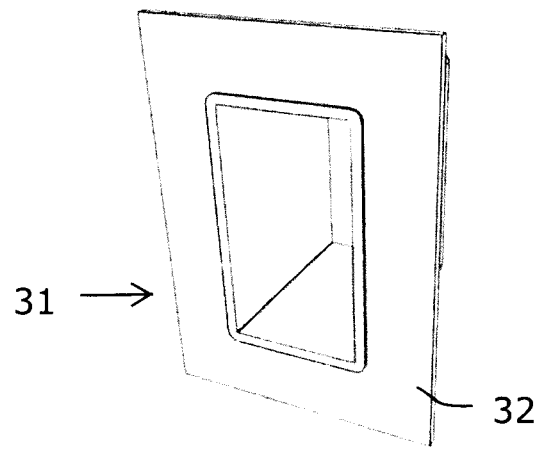
Figure 6G:
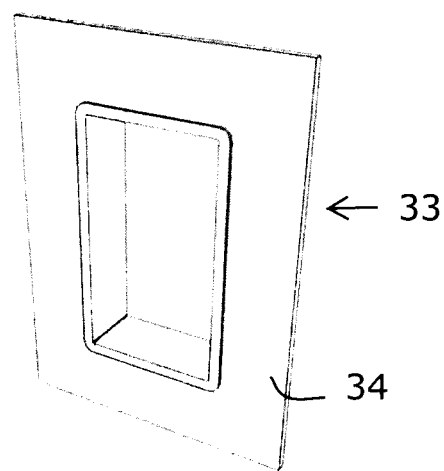

As used in this description the expressions "horizontal", "vertical" and similar expressions are in relation to the enclosed FIGS., showing the transition in a common orientation. In the description below the same reference signs are used for corresponding parts of different embodiments.

The transition comprises a steel frame 1. In the embodiment shown in FIGS. 1 and 2 the frame 1 has two openings or compartments. The exact form of the frame and the number of compartments of the frame may vary. The compartments are normally either square or rectangular with or without rounded corners. Thus, in other embodiments the frame has only one compartment, or several compartments divided horizontally and/or vertically. Inside each compartment of the frame 1 a compression unit 2 and one or more modules 3 are placed. The frame 1 is normally welded or bolted to a structure, such as a bulkhead, deck, roof or wall. In some embodiments the frame 1 has a flange and is normally welded or bolted by means of the flange to the structure.

Compression units 2 of different designs may be used. In one embodiment the compression unit 2 comprises a number of co-operating wedge elements. Such compression units are well known to a person skilled in the art; see e.g. WO 96/11353. The compression needed to give smoke protection, i.e. hinder smoke from passing the transition, is lower than is normally needed for a water tight seal.

As indicated in FIG. 6a each frame has a height H, a width W and a depth D, which all refer to the through opening of the frame. The height H and width W are given in view of the orientation of the frames as shown in the enclosed FIGS., but a person skilled in the art realises that the frames can have other orientations.

Each module 3 is to receive one or more cables 4, pipes or wires. The modules 3 are made of a compressible material. The compressible material of the modules 3 is rubber in one embodiment. The rubber of the module 3 has intumescent properties in some embodiments but no intumescent properties in other embodiments.

The modules have different sizes depending on the intended use and the number and size of the cables 4 to be received in a specific module.

FIG. 2 shows a module 3 about to being formed by bringing two module halves 5 together. The module 3 has the form of an outer shell, inside which outer shell an intumescent material 6 is placed. In the embodiment shown in FIG. 2 there is one layer of intumescent material 6 in each module half 5. In case of fire or extensive heat the intumescent material will swell, closing off the transition. The intumescent material 6 used is compressible, whereby it will be formed around the cables 4 etc. received inside the module, when a pressure is applied.

Each module half 5 has a horizontal part 7 and two vertical parts 8 at opposite sides of the horizontal part 7. The outer shell of the module 3 is formed by the horizontal parts 7 and the vertical parts 8 of the two module halves 5 forming the module 3. The horizontal part 7 has the form of a rectangular plate having a length and width corresponding to the width W and depth D of the frame 1, respectively. The vertical parts 8 also have the form of plates and are placed at right angles to the horizontal part 7. The vertical parts 8 project on one side from the horizontal part 7, giving the module half 5 a U-profile. The vertical parts 8 have free sides 9 remote form the horizontal part 7. The modules 3 are formed in that two module halves 5 are placed with the free sides 9 of the vertical parts 8 abutting each other. In use the vertical parts 8 of the module halves 5 are to abut inner sides of the frame 1. In use the horizontal parts 7 of each module 3 are to abut a horizontal part 7 of an adjacent module 3, the compression unit 2 and/or a side of the frame 1 or compartments of the frame 1.

The intumescent material 6 is normally provided in the form of blocks, carpets or rods. The provided intumescent material 6 is then cut to an appropriate size to fit into a module half 5. The intumescent material 6 used should be elastic enough to be formed around the cables 4 etc. received inside a module 3. In the shown embodiment an outer surface of the intumescent material 6 is placed flush with the free sides 9 of the vertical parts 8 of the module halves 5 in the not compressed condition. In other embodiments the intumescent material 6 protrudes over the free sides 9 of the vertical parts 8 of the module halves 5, in the not compressed state.

Each module half 5 has a flange 10, at one end of each vertical part 8, which flange 10 projects away from the vertical parts 8 and the horizontal part 7. Said flanges 10 are placed on the same side of the module half 5. The flanges 10 will form a stop for the module half 5, when the module half 5 is inserted into the frame 1. The distance between the outer edges of the flanges 10 of one module half 5 is larger than the inner width W of the through opening of the frame 1. Thus, when a module half 5 is fully inserted into the frame 1, the flanges 10 will abut the sides of the frame 1.

In FIG. 4 examples of module halves 11, 12, 13, 14 of different sizes are shown. The size of the module halves 5, 11, 12, 13, 14 chosen depends on the outer diameter and the number of respective cables 4 etc. to be received in a particular module 3. Each module half 11, 12, 13, 14 has a horizontal part 7 and two vertical parts 8 with flanges 10 in the same way as described above. Intumescent material 6 is placed in each module half 11, 12, 13, 14. In each module half there is one or more layers of intumescent material 6. In module halves 14 having several layers of intumescent material 6 one or more cables 4 are to be received between each pair of adjacent layers of intumescent material 6, as indicated in FIGS. 1 and 2.

In FIG. 5 a further embodiment of a module half 15 according to the present invention is shown. Said module half 15 has three compartments 16. In the same way as described above each module half 15 has a horizontal part 17 and two vertical parts 18. The vertical parts 18 are placed at opposite sides of the horizontal part 17 and at right angles to the horizontal part 17. The horizontal parts 17 and vertical parts 18 of two module halves 15 form an outer shell of a module 3, formed by bringing the two module halves 15 together. A flange 19 is placed at each outer corner of the module half 15, which flanges 19 extend along the vertical parts 8. The flanges 19 are to be placed abutting the frame 1, keeping the module halves 15 inside the frame 1. In order to insert the module halves 15 having flanges 19 at all outer corners into the through opening of the frame 1, the module halves 15 are inserted in a leaning position. It is also possible to compress the module halves 15 enough to let the flanges 19 at one side pass the frame 1 at insertion. In the shown embodiment two outer of said three compartments 16 are filled with a layer of cellular rubber 20, which cellular rubber 20 is of a material preventing passage of smoke. The compartment 16 placed in the middle has a layer of intumescent material 21. The compartments 16 are oriented perpendicular to the axial direction of one or more cables 4 etc. to be received inside a module formed of two module halves 15. In another embodiment of a module half having three compartments 16 the two outer compartments 16 are filled with intumescent material 6, while the compartment in the middle forms an air gap. Also other compartments or all compartments can be filled with intumescent material 6.

In FIGS. 6a-6g different embodiments of frames to be used in a transition according to the present invention are shown. FIG. 6a shows a frame 22 having straight corners 23. FIGS. 6b, 6c and 6d show frames 24, 26, 28 having rounded corners 25, 27, 29 with different radii. The frames 30, 31, 33 of FIGS. 6e, 6f and 6g all have straight corners. The frames 30, 31, 33 of FIGS. 6e-6g have a larger depth than the frames 22, 24, 26, 28 of FIGS. 6a-6d. The frames 31, 33 of FIGS. 6f and 6fg have a flange 32, 34 used for attaching the frame 31, 33 to a wall, roof, partion, deck or the like. The different features of the frames of FIGS. 6a-6g may be combined in different other ways. It is for instance possible to have flanges 32, 34 as according to FIGS. 6f and 6g in frames having rounded corners 25, 27, 29 as according to FIGS. 6b-6d. It is also possible to have frames where at least one of the corners is straight and the rest of the corners are rounded and vice versa.

In use one or more cables 4 are placed between two module halves 5, 11, 12, 13, 14, 15, 35. For module halves 5, 11, 12, 13, 15, 35 having only one layer of intumescent material 6 the one or more cables 4 are placed on top of the intumescent material 6 of respective module half 5, 11, 12, 13, 15, 35. For module halves 14 having several layers of intumescent material 6 the one or more cables 4 are placed between pairs of adjacent layers of intumescent material 6. The modules 3 are then formed by two module halves 5, 11, 12, 13, 14, 15, 35 being brought together and are then inserted into the frame 1, 22, 24, 26, 28, 30, 31, 33. The modules 3 are pushed into the opening of the frame 1, 22, 24, 26, 28, 30, 31, 33 until the flanges 10, 19 of the module 3 hit the frame 1, 22, 24, 26, 28, 30, 31, 33. If needed to fill out the opening of the frame 1, 22, 24, 26, 28, 30, 31, 33, modules 3 without any received cables 4 are also inserted into the frame 1, 22, 24, 26, 28, 30, 31, 33. When all the modules 3 have been inserted, the compression unit 2 is inserted into the frame 1, 22, 24, 26, 28, 30, 31, 33. The compression unit 2 is inserted in a non-activated condition. The compression unit 2 is then activated, whereby the compression unit 2 will expand in the direction of the height H of the frame 1, 22, 24, 26, 28, 30, 31, 33. By the expansion of the compression unit in said direction, the modules 3 will be compressed in the same direction, giving expanding forces in the perpendicular directions. The modules 3 will thereby press against the inner sides of the frame and against any adjacent modules 3. The force excerted on the modules 3 will be transferred also to the intumescent material 6, which intumescent material will be pressed closer around the one or more cables 4 received in each module 3. As the intumesecent material 6 is pressed closely around the one or more cables 4, it will seal the opening of the frame 1, 22, 24, 26, 28, 30, 31, 33, hindering smoke from passing the formed transition.

In case of fire or extensive heat the intumescent material 6 will swell, hindering a possible fire to be spread through the transition.

The invention claimed is:

1. A module to be placed inside a frame, the module comprises two module halves and is to receive one or more cables, pipes, or wires, the two module halves each comprise an outer shell of a compressible material, and an intumescent material placed inside the outer shell, wherein the two modules halves each comprise a horizontal part and two vertical parts, and wherein the two modules halves each have a flange on at least one end of respective vertical parts, and wherein each module half comprises two or more compartments of which at least one compartment receives the intumescent material and wherein the compartments are oriented transversely to a longitudinal direction of the one or more cables to be received inside the module.

2. The module of claim 1, wherein a layer of cellular rubber, preventing passage of smoke, is placed in each of two outer compartments.

3. The module of claim 1, wherein the intumescent material is compressible.

4. The module of claim 1, wherein the vertical parts of the module halves are placed on opposite sides of the horizontal part giving a U-like profile and wherein the vertical parts of each module half are arranged with right angles in relation to the horizontal part.

5. The module of claim 1, wherein the outer shell of each module is formed of the horizontal parts and the vertical parts of the module halves being placed together to form the module.

6. A module to be placed inside a frame, the module comprises two module halves and is to receive one or more cables, pipes, or wires, the two module halves each comprise an outer shell of a compressible material, and an intumescent material placed inside the outer shell, wherein the two modules halves each comprise a horizontal part and two vertical parts, and wherein the two modules halves each have a flange on at least one end of respective vertical parts, wherein the vertical parts of the module halves are placed on opposite sides of the horizontal part giving a U-like profile and wherein the vertical parts of each module half are arranged with right angles in relation to the horizontal part, wherein the outer shell of each module is formed of the horizontal parts and the vertical parts of the module halves being placed together to form the module, wherein the module halves are placed with free sides of the vertical parts abutting each other when forming the modules, and wherein the intumescent material is placed inside each module half with an upper surface of the intumescent material protruding above the free sides of each vertical part of each module half in a non compressed state.

7. The module of claim 6, wherein the intumescent material is compressible.

8. The module of claim 1, wherein the module halves are placed with free sides of the vertical parts abutting each other when forming the modules.

9. The module of claim 1, wherein the intumescent material is placed inside each module half with an upper surface of the intumescent material flush with the free sides of the vertical parts of each module half in a non compressed condition.

10. The module of claim 1, wherein the intumescent material is placed inside each module half with an upper surface of the intumescent material protruding above the free sides of each vertical parts of each module half in a non compressed state.

11. The module of claim 1, wherein the intumescent material received inside each module half is placed in two or more layers.

12. The module of claim 6, wherein the intumescent material is placed inside each module half with an upper surface of the intumescent material flush with the free sides of the vertical parts of each module half in a non compressed condition.

13. The module of claim 6, wherein the intumescent material received inside each module half is placed in two or more layers.

* * * * *